United States Patent [19]

Kretschmer et al.

[11] Patent Number: 4,768,135
[45] Date of Patent: Aug. 30, 1988

[54] HEADLIGHT ARRANGEMENT FOR VEHICLES

[75] Inventors: Heinz Kretschmer, Bönnigheim, Fed. Rep. of Germany; Christian Lietar, Morges, Switzerland; Gerhard Lindae, Leonberg; Richard Loewe, Gerlingen, both of Fed. Rep. of Germany; Jean-Francois Longchamp, Lausanne, Switzerland; Rainer Neumann, Frankfurt am Main, Fed. Rep. of Germany; Eckhard Noelte, Weil der Stadt, Fed. Rep. of Germany; Peter Perthus, Stuttgart, Fed. Rep. of Germany

[73] Assignee: Robert Bosch GmbH, Stuttgart, Fed. Rep. of Germany

[21] Appl. No.: 933,794

[22] Filed: Nov. 21, 1986

[30] Foreign Application Priority Data

Jan. 18, 1986 [DE] Fed. Rep. of Germany ....... 3601388

[51] Int. Cl.⁴ .............................................. B60Q 1/06
[52] U.S. Cl. ........................................ 362/66; 362/71; 362/277; 362/285; 362/61
[58] Field of Search ...................... 362/61, 66, 36, 64, 362/71, 210, 277, 285, 286, 319, 321; 350/518

[56] References Cited

U.S. PATENT DOCUMENTS

| | | | |
|---|---|---|---|
| 4,204,270 | 5/1980 | d'Orsay | 362/71 |
| 4,519,020 | 5/1985 | Little | 362/277 X |
| 4,602,321 | 7/1986 | Bornhorst | 362/285 X |

*Primary Examiner*—Larry Jones
*Attorney, Agent, or Firm*—Michael J. Striker

[57] ABSTRACT

A headlight arrangement for vehicles, particularly for power vehicles, comprises a light source with a light reflector forming a light beam which illuminates a roadway with a predetermined light distribution, and at least one adjustable element for changing the light distribution.

12 Claims, 2 Drawing Sheets

HEADLIGHT ARRANGEMENT FOR VEHICLES

BACKGROUND OF THE INVENTION

The present invention relates to a headlight arrangement for vehicles, and particularly for power vehicles with a light source and a reflector forming a light beam for illuminating a roadway.

Arrangements of the above mentioned general type are known in the art. The light distribution produced by such arrangements is determined by the measuring instructions of respective ECE regulation and is a compromise of different factors which influence the travelling conditions. In these arrangements the once fixed light distribution, particularly in extreme weather conditons in which a desired illumination of the roadway is indispensable, can be not optically sound. This makes harder the vehicle steering and leads to risky and accident prone traffic situations.

SUMMARY OF THE INVENTION

Accordingly, it is an object of the present invention to provide a headlight arrangement for vehicles, which avoids the disadvantages of the prior art.

More particularly, it is an object of the present invention to provide a headlight arrangement in which the above described problems are solved in technically simple manner.

Still an object of the present invention is to provide such a headlight arrangement in which the light distribution and thereby the illumination of the road can be optimized in correspndence with the respective factors of influence, so as to facilitate vehicle steering and eliminate risky and accident prone traffic situations.

In keeping with these objects and with others which will become apparent hereinafter, one feature of the present invention resides, briefly stated, in the headlight arrangement in which at least one controllable element is provided for changing the light distribution of the light formed by the light source and its reflector.

In accordance with another feature of the present invention, at least one sensor registers the traffic situation forwardly of the vehicle and makes a comparison with a predetermined parameter so as to form a signal which is used for controlling the element for changing the light distribution. In this construction, the control is performed without any interference by the vehicle driver.

When the headlight arrangement acts in accordance with the principle of the imaging optics and instead of the light disc has an objective, the light distribution can be changed in a simple manner in accordance with still another feature of the present invention.

The headlight arrangement can be formed as an antidazzling headlight with a diaphragm whose optical edge forms the light-dark limit of the light beam, an additional diaphragm can form the means for changing the light distribution and can move transversely to the axis of the headlight.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
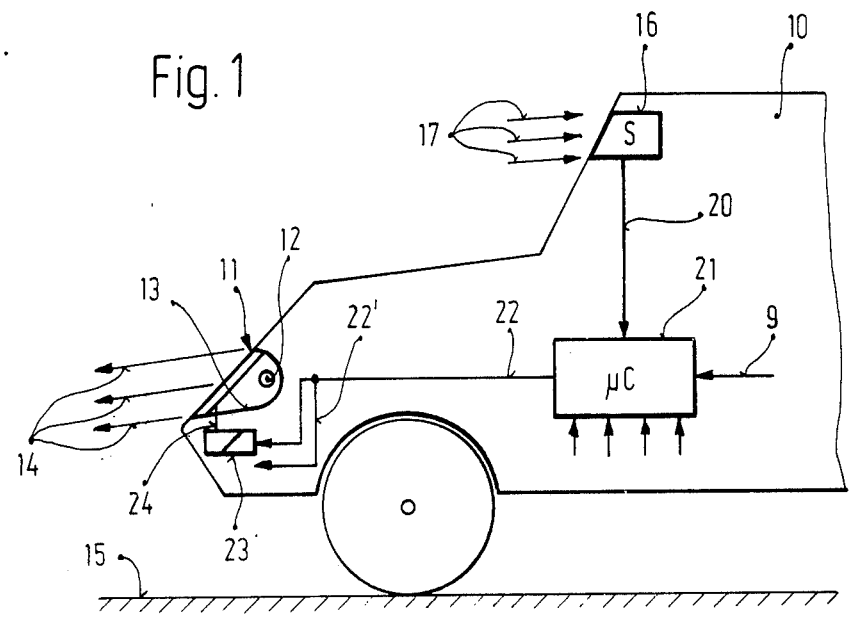
FIG. 1 is a view showing schematically the front part of a personal power vehicle with a block diagram of the headlight arrangement in accordance with the present invention.

A headlight arrangement for a passenger power vehicle 10 has two front headlights 11, of which the second headlight lies behind the first headlight. The front headlights have light sources formed as incandescent lamps 12. There light rays are reflected by a reflector 13 and form a light beam 14. The light beam 14 illuminate the traveling path 15 in a predetermined light distribution which corresponds to the measuring prescription of the associated ECE regulation.

Figure 2:
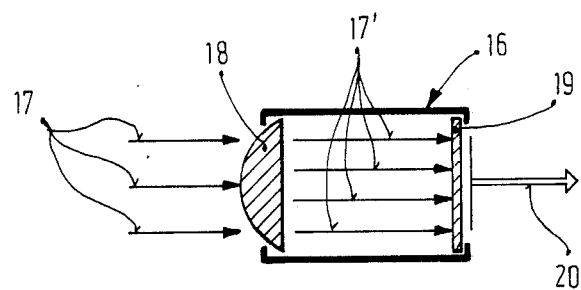
FIG. 2 is a view showing a principal construction of a sensor, not on a proper scale.

The headlight arrangement is provided in the region of the front window with a sensor 16 which registers the traffic situation forwardly of the vehicle 10 as identified by the arrow 17, and first of all determines where in the field of vision of the vehicle driver, changes and actions take place which can influence the traveling conditions. As can be seen from FIG. 2, the sensor 16 has a receiving optical element 18 which projects the traffic situation 17 (brightness, color and the like) through light rays 17' onto a diode matrix 19 as image points which can be evaluated with respect to its brightness. The diode matrix 19 has at least 144 and at most 1296 diodes which are not shown in the drawing, and the ratio of its width to height can be for example 4:1.

As can be seen from FIG. 1, the traffic situation such as roadway direction, roadway condition, traffic density, weather and first of all instantaneous traveling speed are supplied as one or several signals 20 to an electrical computer 21 which is formed as a microprocessor. In the computer 21 predetermined parameters of the traffic situation and possible traveling speeds 9 are stored. By comparison of this parameter with the signal 20 an output signal 22 is formed.

The inventive headlight arrangement is provided also with a controllable element arrangement in the region of each front headlight 11 and formed as an adjusting member 23. The adjusting member 23 is controlled by the output signal 22. The arrangement also has a plunger 24 which extends in the front headlight 11. The adjusting member of the second not shown front headlight is controlled in the same manner by an output signal 22'. The sensor 16 and the computer 21, as well as the adjusting member 23 are electrically connected with one another and form one unit.

Figure 3:
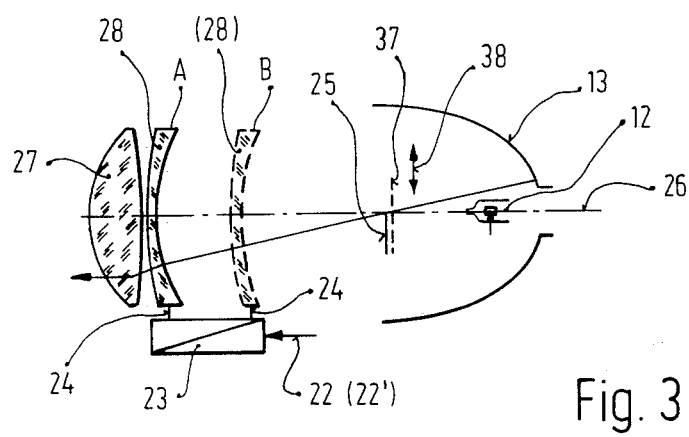
FIG. 3 is a view showing an anti-dazzling headlight operating in accordance with the principle of imaging optics and provided with an element for axial displacement of one objective part and/or a transversely movable additional diaphragm controlled by a computer.

An anti-dazzle headlight operating in accordance with the principle of imaging optics is shown in FIG. 3 and has the reflector 13 whose meridian section has curves of high order. The incandescent lamp 12 is arranged in the region of the reflector focal point. It also has a diaphragm 25 whose optically active edge forms light-dark limit of the anti-dazzle light beam. The anti-dazzle light headlight has an axis 26.

Figure 4:
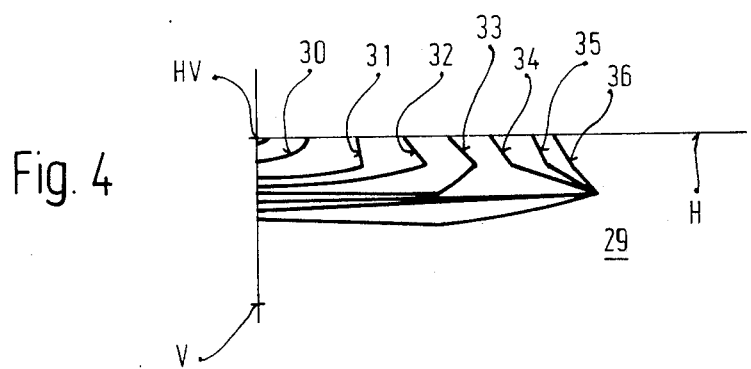
FIG. 4 is a right half of the light distribution corresponding to the position A of the part of objective shown in FIG. 3.

A two-part objective includes a bi-convex lens 27 and a concave-convex lens 28. The plunger 24 of the adjusting member 23 is connected with the edge region of the lens 28. In the position A an anti-dazzle light beam is produced with a light distribution shown in FIG. 4, as illustrated only for the right side. On a measuring screen 29 the horizontal line H and the vertical line V cross one another in the HV point. Here the isolux lines 30–36 identify the same illumination intensity.

Figure 5:
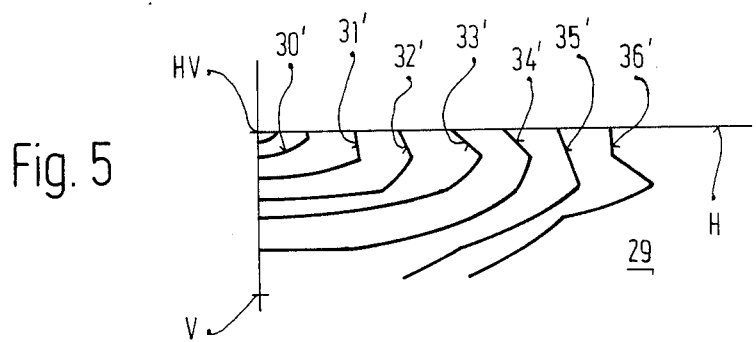
FIG. 5 is a view showing a right half of the light distribution corresponding to the position B of the part of the objective in FIG. 3.

When the plunger 24 of the adjusting member 23 controls the lens 28 in direction of the axis 20, in the position B, the light distribution changes in a manner shown in FIG. 5 in which the associated isolux lines are identified as 30'–36'. It is to be understood that between both position A and B there is a stepless adjustment of the lens 28 with the associated intermediate light distribution.

The headlight arrangement, for example, the anti-dazzle light headlight arrangement, has also a controllable element for changing the light distribution and formed as an additional diaphragm 37. The latter is displaceable transversely to the optical axis 26 as identified by the double arrow 38. In the not shown manner the displacement of the additional diaphragm 38 is performed by an adjusting member which is controllable by the output signal 22 of the computer 21. The parameters of influence here are especially the roadway direction, roadway condition, traffic density and weather.

It will be understood that each of the elements described above, or two or more together, may also find a useful application in other types of constructions differing from the types described above.

While the invention has been illustrated and described as embodied in a headlight arrangement for vehicles, particularly for power vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight arrangement for vehicles, particularly for power vehicles, comprising a light source with a light reflector forming a light beam which illuminates a roadway with a predetermined light distribution; means for sensing a traffic situation forwardly of a vehicle and including at least one sensor with a receiving optical element; means for comparing the sensed traffic situation with at least one predetermined parameter and thereby forming a signal; and an element for changing the light distribution, controlled by said signal.

2. An arrangement as defined in claim 1, wherein said means for sensing and means for comparing and forming together form a device installable on a vehicle.

3. An arrangement as defined in claim 1; and further comprising an objective including two lenses having an axis, said element for changing the light distribution being formed so as to displace at least one of said lenses in the direction of said axis.

4. An arrangement as defined in claim 1; and further comprising a headlight having an axis; a diaphragm which determines an optically effective edge of light-dark limit of the light beam; and an additional diaphragm displaceable transversely to said axis by said element so as to change the light distribution.

5. An arrangement as defined in claim 4, wherein said element is formed so as to displace said additional diaphragm in dependence upon roadway direction, roadway condition, traffic density, weather.

6. A headlight arrangement for vehicles, particularly for power vehicles, comprising a light source with a light reflector forming a light beam which illuminates a roadway with a predetermined light distribution; at least one adjustable element for changing the light distribution; means for sensing a traffic situation forwardly of a vehicle; means for comparing the sensed traffic situation with at least one predetermined parameter and thereby forming a signal which controls said element for changing the light distribution, said means for comparing and forming being formed as an electronic computer connected with said means for sensing and said element for changing the light distribution.

7. An arrangement as defined in claim 6, wherein said computer is formed so that it stores various traffic situations as said predetermined parameter.

8. An arrangement as defined in claim 7, wherein said computer is formed so that it stores possible speeds of the vehicle as said predetermined parameter and receives said signal as a respective speed of the vehicle.

9. An arrangement as defined in claim 7, wherein said computer is formed so that it stores as said parameter roadway direction, roadway condition, traffic density and weather.

10. A headlight arrangement for vehicles, particularly for power vehicles, comprising a light source with a light reflector forming a light beam which illuminates a roadway with a predetermined light distribution; at least one adjustable element for changing the light distribution; means for sensing a traffic situation forwardly of a vehicle; means for comparing the sensed traffic situation with at least one predetermined parameter and thereby forming a signal which controls said element for changing the light distribution, said means for sensing a traffic situation including at least one sensor which includes a receiving optical element and a dioxide matrix arranged so that said receiving optical element projects the traffic situation onto said diode matrix.

11. An arrangement as defined in claim 10, wherein said diode matrix has at least 144 and at most 1296 diodes.

12. An arrangement as defined in claim 10, wherein said diode matrix has the ratio of its width to its height equal to approximately 4:1.

* * * * *